US012770051B2

(12) United States Patent
Soleimani et al.

(10) Patent No.: US 12,770,051 B2
(45) Date of Patent: Oct. 20, 2026

(54) SYSTEMS AND METHODS FOR MACHINE LEARNING INTERPRETABILITY

(71) Applicant: Kinaxis Inc., Kanata (CA)

(72) Inventors: Behrouz Haji Soleimani, Halifax (CA); Andrea Pagotto, Ottawa (CA); Seyednaser Nourashrafeddin, Ottawa (CA); Chantal Bisson-Krol, Kanata (CA)

(73) Assignee: Kinaxis Inc., Ottawa (CA)

( * ) Notice: Subject to any disclaimer, the term of this patent is extended or adjusted under 35 U.S.C. 154(b) by 1150 days.

(21) Appl. No.: 17/073,777

(22) Filed: Oct. 19, 2020

(65) Prior Publication Data

US 2021/0117863 A1 Apr. 22, 2021

Related U.S. Application Data

(60) Provisional application No. 62/923,508, filed on Oct. 19, 2019.

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 20/20; G06N 3/08; G06N 7/01
See application file for complete search history.

(56) References Cited

U.S. PATENT DOCUMENTS

| | | | | |
|---|---|---|---|---|
| 7,895,168 B2 | 2/2011 | Barbee et al. | | |
| 10,510,022 B1 * | 12/2019 | Tharrington, Jr. | ..... | G06N 5/045 |
| 2006/0167654 A1 * | 7/2006 | Keinan | ................. | G06Q 10/04 702/181 |
| 2017/0330109 A1 | 11/2017 | Maughan et al. | | |
| 2020/0074370 A1 | 3/2020 | Oliveira Almeida et al. | | |
| 2020/0074401 A1 | 3/2020 | Williams et al. | | |
| 2020/0097858 A1 | 3/2020 | Baikalov et al. | | |
| 2020/0193313 A1 * | 6/2020 | Ghanta | .................. | G06N 20/00 |

(Continued)

FOREIGN PATENT DOCUMENTS

WO 2021072556 A1 4/2021

OTHER PUBLICATIONS

Prasad, K. Sai, O. Subhash Chander, G. Prabhakar Reddy, and S. Gururaj. "Artificial Intelligence approach for Classifying Molecular Dataset using Density based technique with appropriate Euclidean Distance measure." Materials Today: Proceedings 4, No. 8 (2017): 8827-8836. (Year: 2017).*

(Continued)

*Primary Examiner* — Michael J Huntley
*Assistant Examiner* — Maggie Thanh Maido
(74) *Attorney, Agent, or Firm* — Ruggiero McAllister & McMahon LLC

(57) ABSTRACT

Methods and systems that provide machine learning interpretability. SHAP values of historical and predicted data, along with features of both, are used to provide a measure of the impact of training data points on a predictions. Removal of an individual training data point from a training data set, followed by comparing the resulting prediction with that obtained by the full training data set, also provides a measure of influence of individual training data points on forecasts.

18 Claims, 10 Drawing Sheets
(6 of 10 Drawing Sheet(s) Filed in Color)

(56) References Cited

U.S. PATENT DOCUMENTS

| | | | | |
|---|---|---|---|---|
| 2020/0302318 | A1* | 9/2020 | Hetherington | G06N 20/20 |
| 2020/0334492 | A1* | 10/2020 | Yuan | G06N 20/00 |
| 2020/0334557 | A1* | 10/2020 | Kale | G06N 20/00 |
| 2020/0394265 | A1* | 12/2020 | Ray | G06F 40/205 |
| 2021/0042613 | A1* | 2/2021 | Öztireli | G06N 5/045 |

OTHER PUBLICATIONS

Gallardo, José Manuel, N. Jiménez, and Andrés Jiménez-Losada. "A Shapley distance in graphs." Information Sciences 432 (2018): 269-277. (Year: 2018).*

Wang, D., Yang, Q., Abdul, A., & Lim, B. Y. (May 2019). Designing theory-driven user-centric explainable AI. In Proceedings of the 2019 CHI conference on human factors in computing systems (pp. 1-15). (Year: 2019).*

Fu, T. C., Chung, F. L., Luk, R., & Ng, C. M. (Apr. 2007). Representing financial time series based on data point importance. Engineering Applications of Artificial Intelligence, 21(2), 277-300. (Year: 2007).*

Gradient colour scales—scale_colour_gradient.—scale_colour_gradient • ggplot2. (n.d.). https://web.archive.org/web/20191011181303/https://ggplot2.tidyverse.org/reference/scale_gradient.html (Year: 2019).*

Ghorbani, A., & Zou, J. (Jun. 2019). Data Shapley: Equitable Valuation of Data for Machine Learning. arXiv e-prints, arXiv-1904. (Year: 2019).*

Search Report from corresponding International Application No. PCT/CA2020/051400, mailed Jan. 14, 2021.

Lundberg, S.M. et al., "A Unified Approach to Interpreting Model Predicrion", arXiv.org, pp. 1-10, Nov. 25, 2017, retrieved from https://arxiv.org/abs/1705.07874.

Biehl, et al., "Prototype-based Models in Machine Learning," Wiley Interdisciplinary Reviews, 2016, vol. 7(2), pp. 92-111.

Canadian Patent Application No. 3155102 Office Action dated Oct. 13, 2023.

Tsai, et al.,"Distance-based Features in Pattern Classification," EURASIP Journal on Advances in Signal Processing, 2011, vol. 62, pp. 1-11.

Arras, et al., "Evaluating Recurrent Neural Network Explanations," arXiv, 2019, pp. 1-14.

European Patent Application No. 208779421, Extended European Search Report dated Jan. 8, 2024.

European Patent Application No. 208779421, Office Action dated Jan. 25, 2024.

Frye, et al., "Asymmetric Shapley Values: Incorporating Causal Knowledge Into Model-agnostic Explainability," arXiv, 2019, pp. 1-20.

Giurgiu, et al., "Explainable Failure Predictions with RNN Classifiers based on Time Series Data," arXiv, 2019, pp. 1-8.

Guilleme, et al., "Agnostic Local Explanation for Time Series Classification," IEEE 31st International Conference on Tools with Artificial Intelligence (ICTAI), 2019, pp. 432-439.

Schlegel, et al., "Towards a Rigorous Evaluation of XAI Methods on Time Series," arXiv, 2019, pp. 4197-4201.

Japanese Patent Application No. 2022-522739, Office Action dated Nov. 1, 2024—English Translation Available.

Yokoi et al., "Proposal of Prediction-Basis-Interpretation Supporting Technology to Enhance Assent Degree to AI Predication Result", IEICE Technical Report, Mar. 2019, pp. 61-66.

Aas, K. et al, "Explaining individual predictions when features are dependent: More accurate approximations to Shapley values", arXiv.org, v2, pp. 1-28, Jun. 17, 2019.

Canadian Patent Application No. 3,155,102, Office Action dated Mar. 18, 2025.

* cited by examiner

SYSTEMS AND METHODS FOR MACHINE LEARNING INTERPRETABILITY

CROSS-REFERENCE TO RELATED APPLICATIONS

This application claims the benefit of U.S. Provisional Patent Application No. 62/923,508, filed Oct. 19, 2019, which is hereby incorporated by reference herein in its entirety.

BACKGROUND

While machine learning provides a powerful predictive tool, a user is often left wondering how training data (which is used to train a machine learning model) is related to a forecast provided by the trained model. This phenomenon is often referred to as a "black box" machine learning model. One method that provides a user an interpretation of machine learning prediction results based on tabular data, uses a chart. There are also some interpretability methods specific to images or textual data. However, there are no methods that are applicable for a time-series forecast.

BRIEF SUMMARY

The present disclosure addresses the problem of visually demonstrating example-based machine learning interpretability explanations of a time series forecast from a black box machine learning model. Disclosed are methods and systems that relate a similarity measure between a chosen predicted point in a forecast and the training data used for training the model, shown with a visualization suitable for interpreting time-series data. This method solves the problem stated above, since it makes it clear from a plot of the time-series data, which point or points in the training data explains the forecasted value of a chosen prediction. The method can involve using SHapley Additive exPlanations (SHAP), which is a unified approach to explain the output of a machine learning model. SHAP may be used by the model to compute feature importances per-instance. These feature importances, and feature values, are used as vectors to compute a similarity between training data and prediction. This method shows not only how the model has weighted the importance of features for explanation of a particular instance, but also can explain why, based on related examples from the past.

In one aspect, a method comprising: training, by a processor, a regression machine learning model using training data; predicting, by the processor, a prediction based on the trained model; receiving, by a machine learning interpretability module, the training data, the trained model and the prediction; and comparing, by the machine learning interpretability module, characteristics of the training data and the prediction.

In some embodiments of the method, comparing characteristics comprises visualization of the training data, the prediction and the characteristics of the training data and the prediction.

In some embodiments of the method, comparing characteristics comprises: determining, by the machine learning interpretability module, a heuristic function value of each training data point; wherein: the prediction comprises a plurality of predicted data points; and the heuristic function incorporates: SHAP values of each training data point; SHAP values of the predicted data points; features values of the training data points; and features values of the predicted data points. The heuristic function can comprise a combination of a SHAP distance and a features distance, wherein: the SHAP distance is a Euclidean distance between a SHAP vector of a training data point and a SHAP vector of a predicted data point; the features distance is a Euclidean distance between a features vector of a training data point and a features vector of a predicted data point; the SHAP vector is an ordered sequence of SHAP values of a data point; and the features vector is an ordered sequence of features values of a data point.

In some embodiments of the method, comparing characteristics comprises: determining, by the machine learning interpretability module, SHAP values of one or more points of the prediction; determining, by the machine learning interpretability module, SHAP values of one or more points of the training data; and determining, by the machine learning interpretability module, for each of the one or more points of the prediction, a difference between the SHAP values of the prediction point and the SHAP values of each of the of the one or more points of the training data. The difference can be a Euclidean distance between a SHAP vector of the prediction point and a SHAP vector of each of the of the one or more points of the training data.

In some embodiments of the method, comparing characteristics comprises: removing, by the machine learning interpretability module, a training data point from the training data to form an amended training data set; retraining, by the machine learning interpretability module, the trained model on the amended training data set; predicting, by the machine learning interpretability module, based on the amended training data set to provide an amended prediction; comparing, by the machine learning interpretability module, a difference between the prediction and the amended prediction; assigning, by the machine learning interpretability module, a measure of influence to the removed training data point, based on the difference.

In another aspect, a system comprising: a processor; and a memory storing instructions that, when executed by the processor, configure the system to: train, by a processor, a regression machine learning model using training data; predict, by the processor, a prediction based on the trained model; receive, by a machine learning interpretability module, the training data, the trained model and the prediction; and compare, by the machine learning interpretability module, characteristics of the training data and the prediction.

In some embodiments, the system is further configured to provide a visualization of the training data, the prediction and the characteristics of the training data and the prediction.

In some embodiments, the system is further configured to: determine, by the machine learning interpretability module, a heuristic function value of each training data point; wherein: the prediction comprises a plurality of predicted data points; and the heuristic function incorporates: SHAP values of each train data point; SHAP values of the predicted data points; features values of the training data points; and features values of the predicted data points. 11. The heuristic function can comprise a combination of a SHAP distance and a features distance, wherein: the SHAP distance is a Euclidean distance between a SHAP vector of a training data point and a SHAP vector of a predicted data point; the features distance is a Euclidean distance between a features vector of a training data point and a features vector of a predicted data point; the SHAP vector is an ordered sequence of SHAP values of a data point; and the features vector is an ordered sequence of features values of a data point.

In some embodiments, the system is further configured to: determine, by the machine learning interpretability module, SHAP values of one or more points of the prediction; determine, by the machine learning interpretability module, SHAP values of one or more points of the training data; and determine, by the machine learning interpretability module, for each of the one or more points of the prediction, a difference between the SHAP values of the prediction point and the SHAP values of each of the of the one or more points of the training data. The difference can be a Euclidean distance between a SHAP vector of the prediction point and a SHAP vector of each of the of the one or more points of the training data.

In some embodiments, the system is further configured to: remove, by the machine learning interpretability module, a training data point from the training data to form an amended training data set; retrain, by the machine learning interpretability module, the trained model on the amended training data set; predict, by the machine learning interpretability module, based on the amended training data set to provide an amended prediction; compare, by the machine learning interpretability module, a difference between the prediction and the amended prediction; assign, by the machine learning interpretability module, a measure of influence to the removed training data point, based on the difference.

In yet another aspect, a non-transitory computer-readable storage medium, the computer-readable storage medium including instructions that when executed by a computer, cause the computer to: train, by a processor, a regression machine learning model using training data; predict, by the processor, a prediction based on the trained model; receive, by a machine learning interpretability module, the training data, the trained model and the prediction; and compare, by the machine learning interpretability module, characteristics of the training data and the prediction.

In some embodiments of the non-transitory computer-readable storage medium, the instructions that when executed by a computer, further cause the computer to provide visualization of the training data, the prediction and the characteristics of the training data and the prediction.

In some embodiments of the non-transitory computer-readable storage medium, the instructions that when executed by a computer, further cause the computer to: determine, by the machine learning interpretability module, a heuristic function value of each training data point; wherein: the prediction comprises a plurality of predicted data points; and the heuristic function incorporates: SHAP values of each train data point; SHAP values of the predicted data points; features values of the training data points; and features values of the predicted data points. The heuristic function can comprise a combination of a SHAP distance and a features distance, wherein: the SHAP distance is a Euclidean distance between a SHAP vector of a training data point and a SHAP vector of a predicted data point; the features distance is a Euclidean distance between a features vector of a training data point and a features vector of a predicted data point; the SHAP vector is an ordered sequence of SHAP values of a data point; and the features vector is an ordered sequence of features values of a data point.

In some embodiments of the non-transitory computer-readable storage medium, the instructions that when executed by a computer, further cause the computer to: determine, by the machine learning interpretability module, SHAP values of one or more points of the prediction; determine, by the machine learning interpretability module, SHAP values of one or more points of the training data; and determine, by the machine learning interpretability module, for each of the one or more points of the prediction, a difference between the SHAP values of the prediction point and the SHAP values of each of the of the one or more points of the training data. The difference can be a Euclidean distance between a SHAP vector of the prediction point and a SHAP vector of each of the of the one or more points of the training data.

In some embodiments of the non-transitory computer-readable storage medium, the instructions that when executed by a computer, further cause the computer to: remove, by the machine learning interpretability module, a training data point from the training data to form an amended training data set; retrain, by the machine learning interpretability module, the trained model on the amended training data set; predict, by the machine learning interpretability module, based on the amended training data set to provide an amended prediction; compare, by the machine learning interpretability module, a difference between the prediction and the amended prediction; assign, by the machine learning interpretability module, a measure of influence to the removed training data point, based on the difference.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

To easily identify the discussion of any particular element or act, the most significant digit or digits in a reference number refer to the figure number in which that element is first introduced.

DETAILED DESCRIPTION

Figure 1:
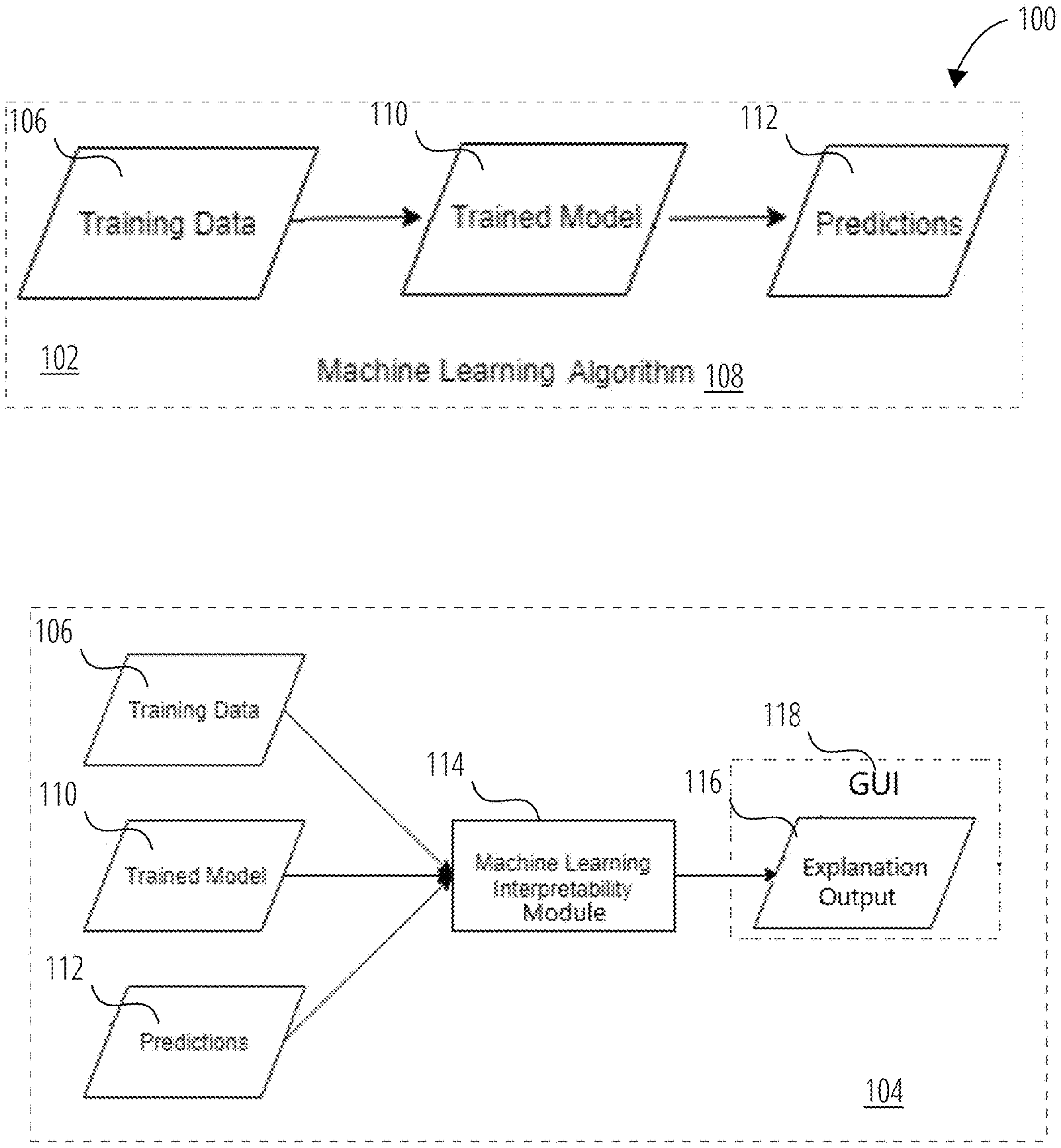
FIG. 1 illustrates a flowchart in accordance with one embodiment.

In the present disclosure, any embodiment or implementation of the present subject matter described herein as serving as an example, instance or illustration, and is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates flowcharts 100 in accordance with one embodiment.

The flowcharts 100 comprise two phases: a first phase 102 and a second phase 104.

In first phase 102, training data 106 is used by a machine learning algorithm 108 to provide a trained model 110. The machine learning algorithm 108 uses the trained model 110 to provide a predictions 112 (or prediction) of future data.

In the second phase 104, the training data 106, the trained model 110, and the predictions 112 are then input to a machine learning interpretability module 114 to provide an explanation output 116. the explanation output 116 can be output visually, which may also include a graphical user interface 118, so as to allow a user to interact with the explanation output 116.

Figure 2:
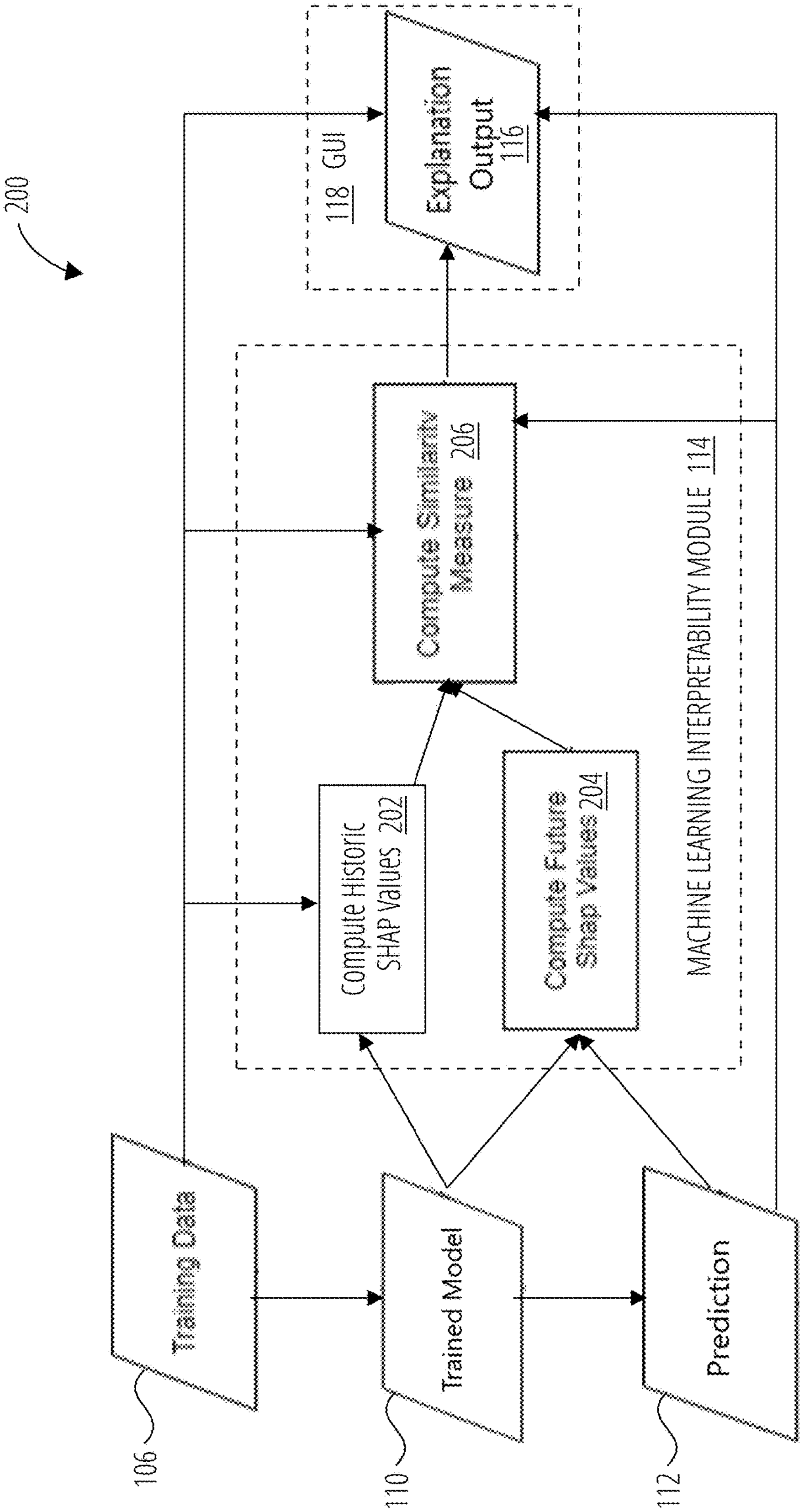
FIG. 2 illustrates a machine learning interpretability module flowchart in accordance with one embodiment.

FIG. 2 illustrates an MLI module flowchart 200 in accordance with one embodiment. That is, FIG. 2 illustrates an embodiment of a machine learning interpretability module 114.

The machine learning interpretability module 114 can operate in the following two stages. The first stage can comprise computation of: historic SHAP values 202 based on training data 106 and trained model 110; and future SHAP values 204 based on trained model 110 and predictions 112.

Once historic SHAP values 202 and future SHAP values 204 are computed, they are used in a second stage: computation of a similarity measure 206 between historic SHAP values 202 and future SHAP values 204.

Similarity measure 206 can then be output as an explanation output 116 for a user. Explanation output 116 can be visual, and may include a graphical user interface 118 so as to allow the user to interact with the results.

In some embodiments, a heuristic function can be used in calculation of similarity measure 206, by including a combination of both the difference between historic SHAP values 202 and future SHAP values 204, and the difference between historic and future features values.

In some embodiments, each point (whether historical or forecast) is accorded a feature vector and a SHAP vector. A feature vector is just an ordered sequence of numerical values assigned to a given feature of the data point. Similarly, a SHAP vector is just an ordered sequence of numerical values assigned to a given SHAP characteristic of the data point.

In some embodiments, a similarity measure can refer to a similarity between a forecast data point and a training data point, as measured by the distance between the vector associated with each point. For example, a measure of feature similarity can be obtained by calculating the distance between the feature vector of the training data point and the feature vector of the forecast point. Similarly, a measure of SHAP similarity can be obtained by calculating the distance between the SHAP vector of the training data point and the SHAP vector of the forecast point.

In some embodiments, a heuristic function can be a combination of the feature distance and the SHAP distance.

Example of a Heuristic Function

In a time series, each training data point can have the following features: year, month, week of year, day of week, season, etc. For seasons, a numerical value can be assigned to a season (e.g. '0' for winter; '1' for summer; or '0' for winter; '1' for spring, '2' for summer; and '3' for fall). Feature vectors provided no information about the attribute or value at the data point. For example, for a lead-time series, the feature vector provides no information about lead-time of any given data point—it only provides information about the features of that data point.

For a given forecast point, '$P_F$', a feature vector of '$P_F$' is obtained based on the features of '$P_F$'. Each training data point '$H_i$', also has its own feature vector. The features similarity between each training data point '$H_i$' and the forecast point '$P_F$' can be calculated by standard techniques for calculating Euclidean distances between vectors.

Similarly, for forecast point, '$P_F$', a SHAP vector of '$P_F$' is calculated. The SHAP vector of each training data point '$H_i$' is also computed. Contrary to the features vector, the SHAP vector includes information about the attribute or value associated with the data point. For example, where lead times are forecasted, the SHAP vector includes information about the lead time for the data point in question. The SHAP similarity between each training data point '$H_i$' and the forecast point '$P_F$' can be calculated by standard techniques for calculating Euclidean distances between vectors.

A simple heuristic function, HF, that includes both the features distance and the SHAP distance can be formulated as follows:

$$HF=a^*(\text{shap distance})+(1-a)^*(\text{features distance}) \quad \text{(EQ. 1).}$$

The value of 'a' can be adjusted between 0 and 1. When a=0, the heuristic function only provides features similarity. When a=1, the heuristic function only provides SHAP similarity.

Figure 3A:
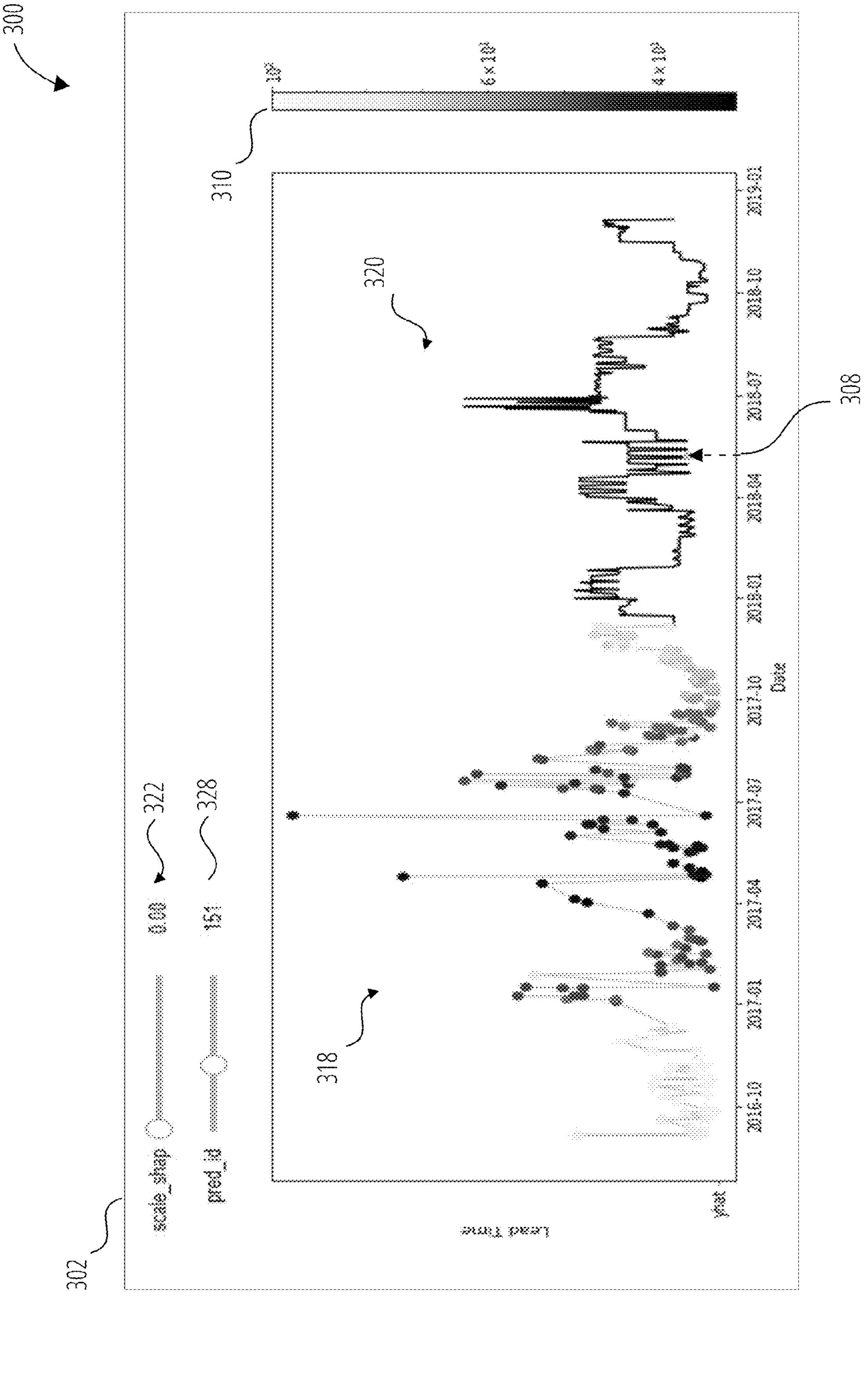
FIG. 3A illustrates a heuristic function example in accordance with one embodiment.
Figure 3B:
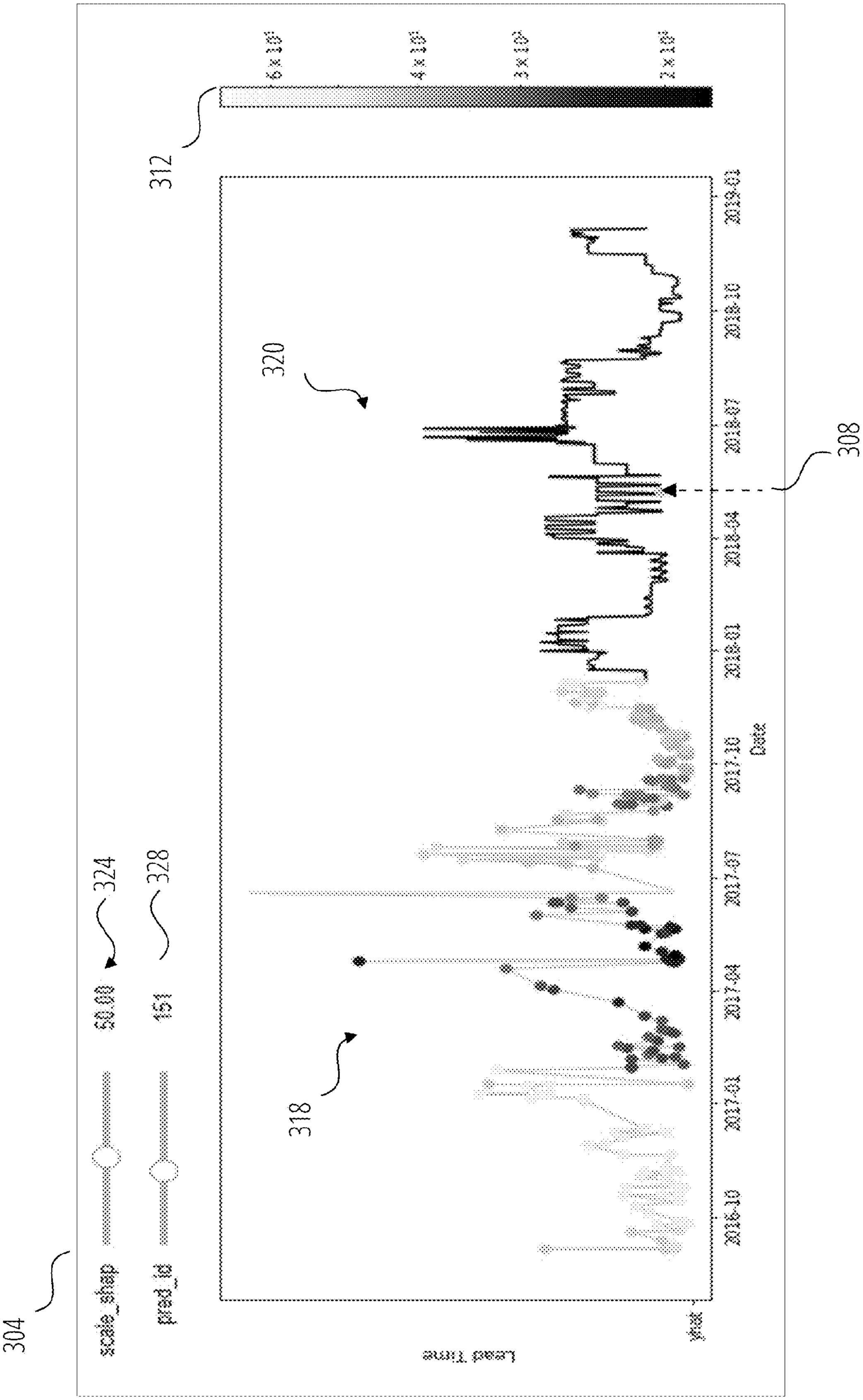
FIG. 3B illustrates a further aspect of the heuristic function example shown in FIG. 3A.
Figure 3C:
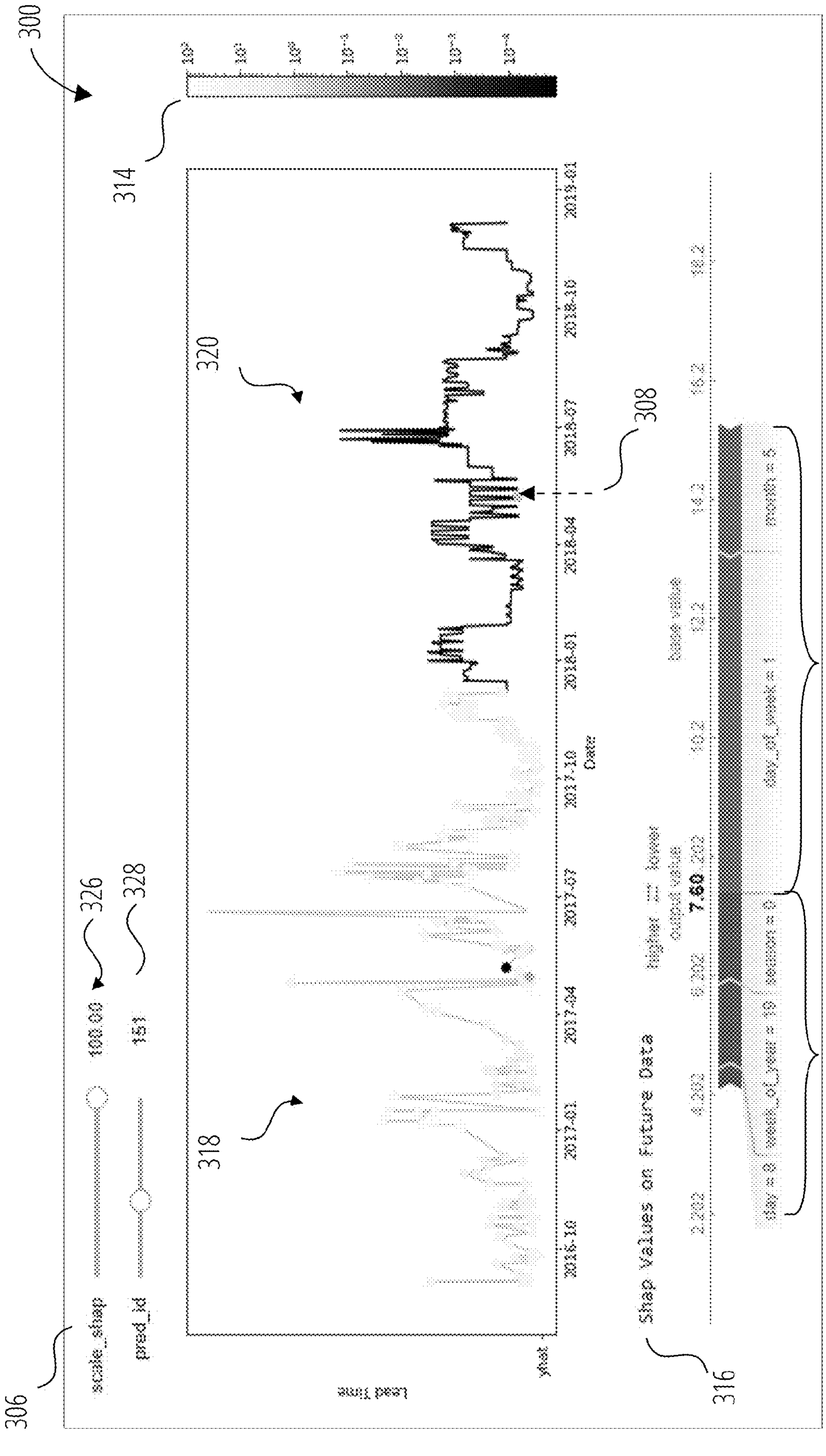
FIG. 3C illustrates a further aspect of the heuristic function example shown in FIG. 3A.

FIG. 3A, FIG. 3B and FIG. 3C illustrate a heuristic function example 300 in accordance with one embodiment. In each of these figures, the historical lead time data 318 is shown from roughly Sep. 1, 2016 to roughly Nov. 30, 2017, while the forecast lead times 320 are shown between roughly Dec. 1, 2016 to roughly Nov. 30, 2018.

Furthermore, each of FIG. 3A, FIG. 3B and FIG. 3C illustrates a SHAP scale 322, which varies from a minimum value of '0' (as shown in FIG. 3A) to a maximum value of '100' (as shown in FIG. 3C). The value of the SHAP scale 322 is equal to the value of 'a'×100, where 'a' is defined in Equation 1. That is, if a=1, the SHAP scale value is 100; if 'a'=0.5, then the SHAP scale value is equal to 50, and so on. That is, the SHAP scale value represents a sliding value of the SHAP distance in the heuristic function defined in EQ. 1 above.

In addition, each of FIG. 3A, FIG. 3B and FIG. 3C illustrates a forecast point scale 328 which designates various points on the forecast lead times 320. In the figures, the forecast point scale 328 is set to '151', which corresponds to the forecast point 308.

SHAP and features similarities are shown for training data points relative to forecast point 308 in each of FIG. 3A, FIG. 3B and FIG. 3C. Furthermore, each figure illustrates a gradient key (gradient key 310 in FIG. 3A; gradient key 312 in FIG. 3B; and gradient key 314 in FIG. 3C). In which the darker the shade of the training data point according to the gradient key, the grater its impact or weight of the training data point on the forecast point 308. While the drawings are shown on a gray-scale, it is understood that the graphical display will be in colour.

FIG. 3A illustrates the case where the SHAP scale 322 value is equal to zero. That is, 'a'=0 in EQ (1), which means that the heuristic function represents only features similarity plot 302. The resulting features similarity plot 302 shows that the darkest points in the historical lead time data 318 occur between training data points in the Mar. 1, 2017-Jul. 1, 2017 range, for forecast point 308 (which is near May 15, 2018). That is, these points with the darkest gradient indicate that the greatest similarities occur between training data points in the Mar. 1, 2017-Jul. 1, 2017 range, for forecast point 308. This is not surprising, since these are training data points that have similar dates (i.e. features) to forecast point 308. The lead time has no bearing on the features similarity.

FIG. 3B illustrates the case where the SHAP scale 322 value is equal to 50. That is, 'a'=0.5 in EQ. (1), which means that the heuristic function represents a half features, half SHAP plot 304. The resulting half features, half SHAP plot 304 indicates that the greatest similarities occur between training data points in the Apr. 15, 2017-Jun. 15, 2017 range, for forecast point 308 (which is near May 15, 2018), as inferred by the points with the darkest gradients. Note how the similarity range has narrowed to Apr. 15, 2017-Jun. 15, 2017 in FIG. 3B (which has half features, half SHAP similarities), from a range of Mar. 1, 2017-Jul. 1, 2017 shown in FIG. 3A (which has only features similarities).

FIG. 3C illustrates the case where the SHAP scale 322 value is equal to 100. That is, 'a'=1.0 in EQ. (1), which means that the heuristic function represents a SHAP similarity plot 306. The resulting SHAP similarity plot 306 indicates that the greatest SHAP similarities occur between training data point of around May 1, 2017 for forecast point 308 (which is near May 15, 2018). Note how the similarity range in FIG. 3C has narrowed successively from the features similarity plot 302 shown in FIG. 3A and the half features, half SHAP plot 304 shown in FIG. 3B.

FIG. 3C also illustrates SHAP values 316 of forecast point 308, which indicate that the most important feature in the historical lead time data 318 for forecast point 308 is when the day of the week is equal to 1, which lowers the forecast lead time to 7.6 days (as opposed to other days of the week). Looking at the training data, based on SHAP similarities, the one training data point around May 1, 2017 has a similar lead time as that of forecast point 308. Looking at this point in the history can provide some explanation about why this predicted point (i.e. Forecast point 308) was given a lower predicted lead time than a forecast point beside it. For a forecast point next to forecast point 308, the day of week has a value different from '1', which, according to SHAP values 316 has minimal effect on the forecast. Therefore, any point adjacent to forecast point 308 will not show a decrease in lead-time to the extent shown by forecast point 308.

The next most important feature in the historical lead time data 318 for forecast point 308, is when the month is equal to 5 (that is, the month of May).

Figure 4:
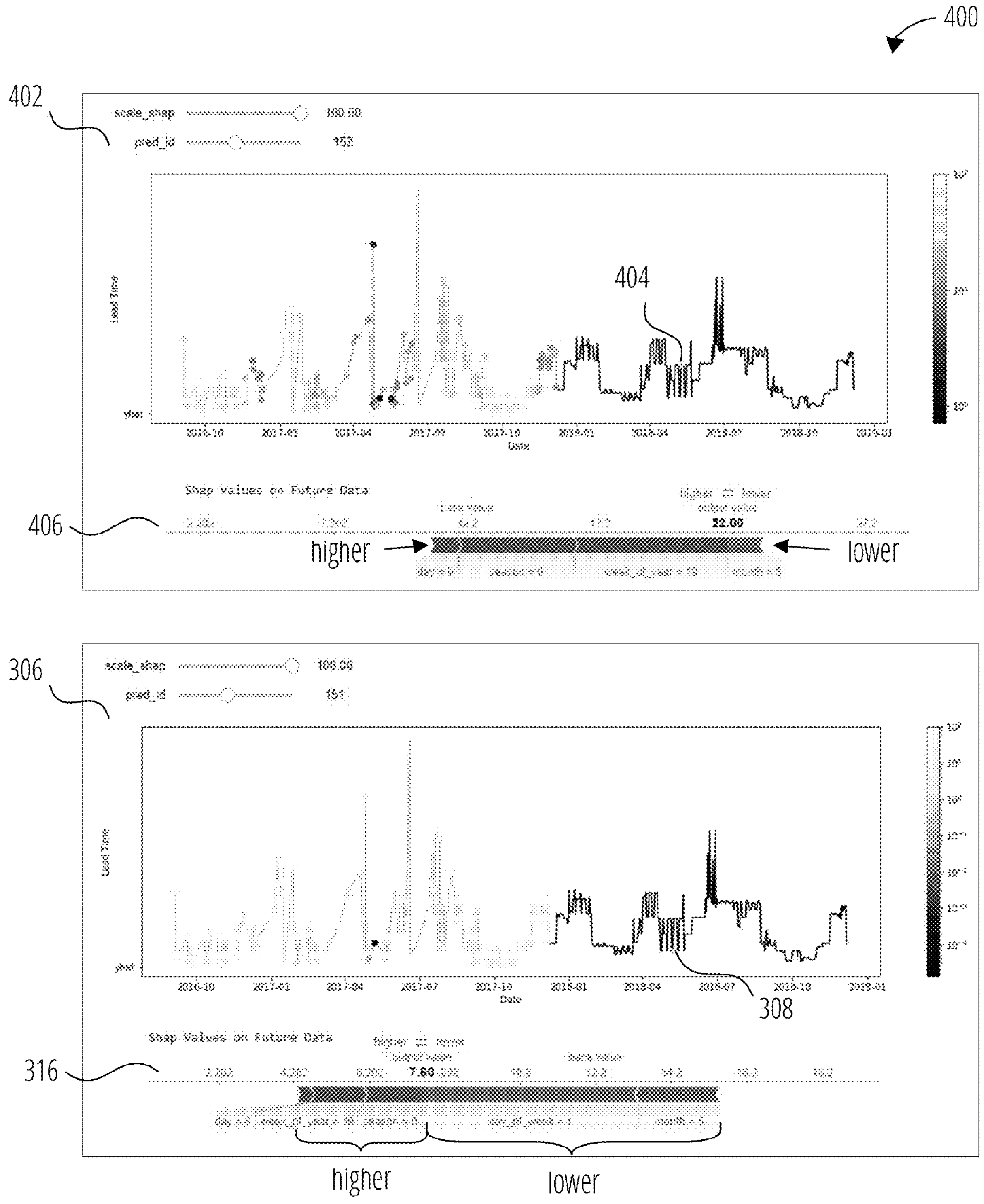
FIG. 4 illustrates an example in accordance with one embodiment.

FIG. 4 illustrates an example 400 in accordance with one embodiment.

In FIG. 4, the difference in historical and future SHAP values are shown for two adjacent forecast point 308 and forecast point 404. SHAP similarity plot 306 and SHAP values 316 are identical to the corresponding illustration shown in FIG. 3C.

Forecast point 404 is one day after forecast point 308.

For forecast point 308, the greatest impact in lowering the forecast lead time to 7.6 days is when the day of the week is −1, as shown in SHAP values 316. For forecast point 404, the forecast lead time jumps to 22, as shown by SHAP values 406. Furthermore, the day of the week has no impact in lowering the projected lead time. In contrast to forecast point 308, the week of the year set to 19 has the highest impact for forecast point 404. While the drawings are shown on a gray-scale, it is understood that the graphical display will be in colour.

Figure 5:
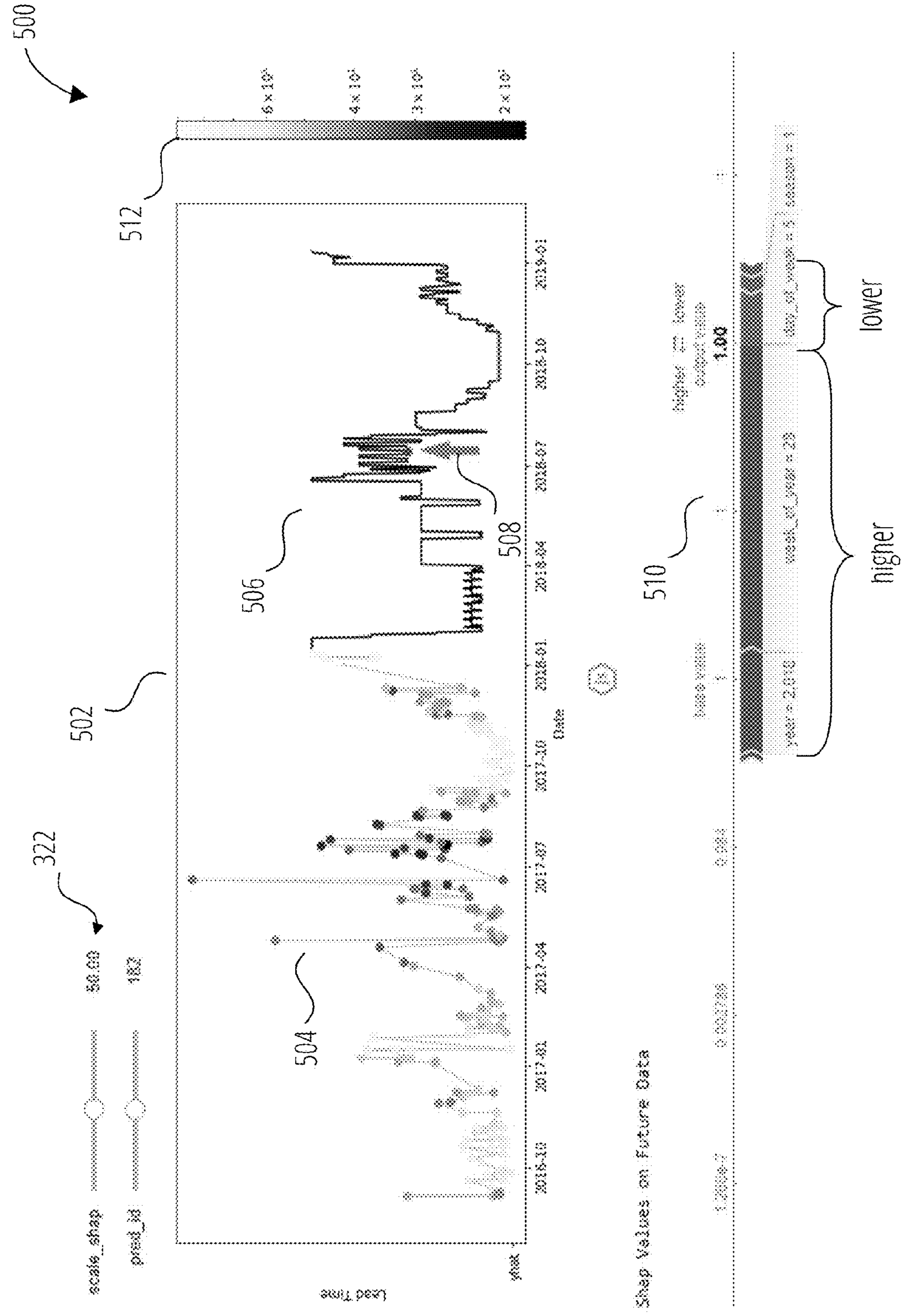
FIG. 5 illustrates an example in accordance with one embodiment.

FIG. 5 illustrates an example 500 in accordance with one embodiment.

Graph 502 illustrates an example of lead time v. date, showing both historical data 504 and prediction 506. In FIG. 5, prediction point 508 (shown by the arrow, at around July 5) is highlighted. In example 500, the features are: year, month of the year, week of the year, day of the year and season (e.g. '0' for winter; '1' for summer).

The SHAP values 510 of prediction point 508 indicate that the prediction point 508 has a forecasted lead time of 1.00 (output value). The week of the year value of 28 has the greatest impact on the forecast, while the year (2018) is next in impact. The day of the week is next, in terms of impact on the forecast; if the day of the week is other than 5, the resulting forecast of lead time will be higher. Season (with value '1') has minimal impact on prediction point 508.

The impact of each training data point on prediction point 508, is shown by the gradient key 512 of a heuristic function that includes a combination of historical SHAP vector distances and features vector distances, as described above. In FIG. 5, the SHAP scale 322 value is 50, which corresponds to '1'=0.5 in EQ. (1). While the drawings are shown on a gray-scale, it is understood that the graphical display will be in colour.

In FIG. 5, a sliding scale value of 50 (out of 100) (shown by SHAP scale 322) has been used in the evaluation of the heuristic function, which means that features vector distances and historical SHAP vector distances are combined equally in the evaluation of the heuristic function.

Figure 6:
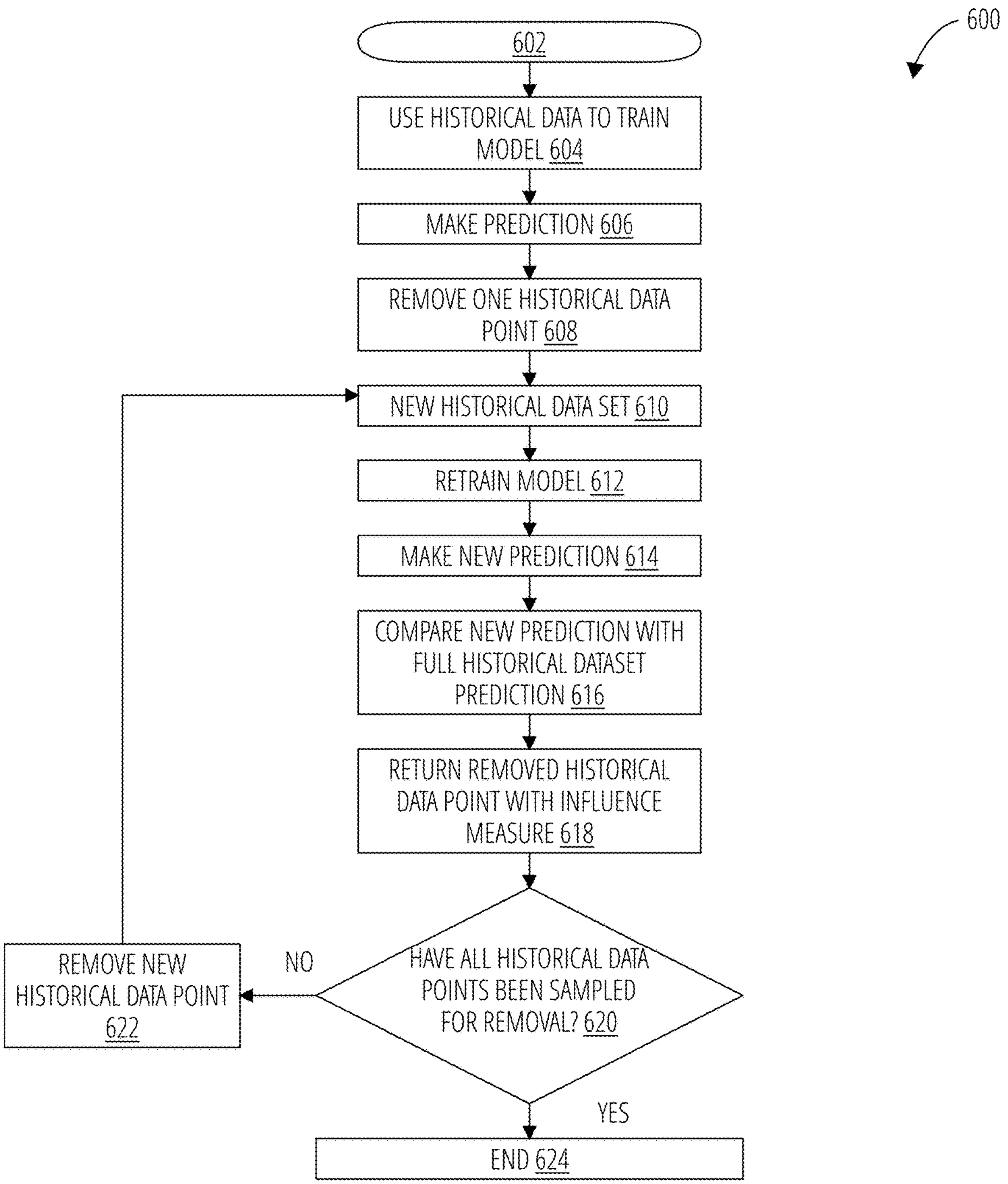
FIG. 6 illustrates a flowchart in accordance with one embodiment.

FIG. 6 illustrates a flowchart 600 in accordance with one embodiment.

Flowchart 600 illustrates another embodiment of machine learning interpretability, in which an influence of a training data point (on a forecast) is provided. Influence is not measured by a SHAP characteristic, but instead, on how removal of that training data point affects the forecast.

At block 604, training data is used to train a machine learning model. The model is used to make a prediction at block 606. In order to obtain a measure of the influence of each training data point on the prediction, each training data point is removed individually (at block 608) to form a modified or new training data set at block 610; the model is retrained at block 612 on the new data set, and a new prediction is made at block 614. At block 616, results of the prediction (made at block 614) are compared with the results of the prediction made with the full training data set (made at block 606). The comparison may be made in any number of ways known in the art. The removed point is then returned to the training data set at block 618, along with a measure of the influence of the removed data point. Embodiments of the measure of influence are described below.

If this is not the last data point that has been sampled for removal (decision block 620), then a new training data point is removed at block 622, and the procedure is repeated by using the new training data set at block 610.

If, on the other hand, there are no more data points to sample for removal, then the method ends at block 624, providing a measure of influence for each training data point.

If removal of a particular training data point does not result in a change in the resulting amended data forecast, then that particular training data point has no influence on the prediction. The greater the change in the amended data forecast from the full data forecast, the greater the influence of the particular training data point on the forecast.

The measure of influence can be provided to a user in any suitable manner known in the art. In some embodiments, the measure of influence of each training data point is shown visually in graphical form. In some embodiments, the measure of influence of each training data point is shown visually in tabular form.

Figure 7:
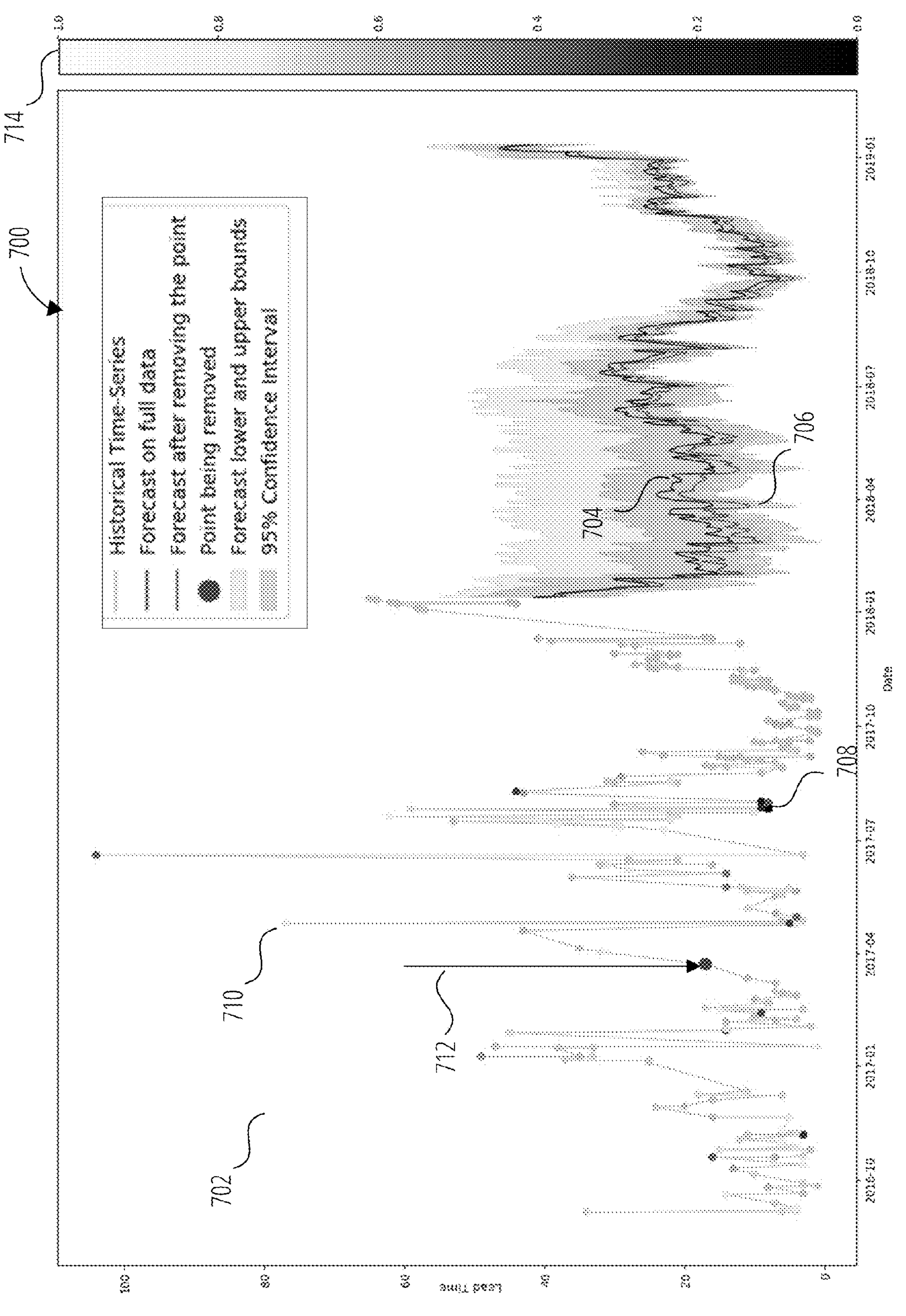
FIG. 7 illustrates an example in accordance with one embodiment.

FIG. 7 illustrates an example 700 in accordance with one embodiment machine learning interpretability. Flowchart 600 was used to obtain illustrative example 700.

Historical data 702 (shown by filled circles) of lead times, from about Sep. 1, 2016 to about Jan. 7, 2018, was used to train a machine model, leading to a full data forecast 704.

In FIG. 7, the historical data point 712 (around Mar. 25, 2017) is removed from the training data set. The revised prediction (based on the removal of historical data point 712) is shown as amended data forecast 706, which is, for the most part, lower than full data forecast 704 throughout the forecast range of about Jan. 8, 2018 to about Jan. 8, 2019. The difference between full data forecast 704 and amended data forecast 706 can be evaluated by known means in the art, and the difference is accorded a difference value for historical data point 712.

In FIG. 7, all of the remaining training data points (i.e. historical data 702 excluding historical data point 712) have undergone the procedure described above for historical data point 712, and have already been accorded a difference value. This is indicated by the shading of the various points of historical data 702. While the drawings are shown on a gray-scale, it is understood that the graphical display will be in colour.

In FIG. 7, a gradient key 714 is used as a measure to indicate that the lighter the shade of a training data point, the lower its influence on the forecast. As an example, data point 710, which is almost white according to gradient key 714, has minimal influence on the forecast. On the other hand, grouping 708 of data points (around Aug. 1, 2017) are dark, which according to gradient key 714, have a large influence on the forecast.

If removal of a particular training data point does not result in a change in the resulting amended data forecast, then that particular training data point has no influence on the prediction. The greater the change in the amended data forecast from the full data forecast, the greater the influence of the particular training data point on the forecast.

A user can glean further information from the colour gradient of historical data 702, by looking for patterns of high-influence data points, or low-influence data points. This can be achieved via a graphical user interface through which the user can select different data points along the historical data 702, and see how the resulting amended data forecast 706 changes relative to the full data forecast 704.

Figure 8:
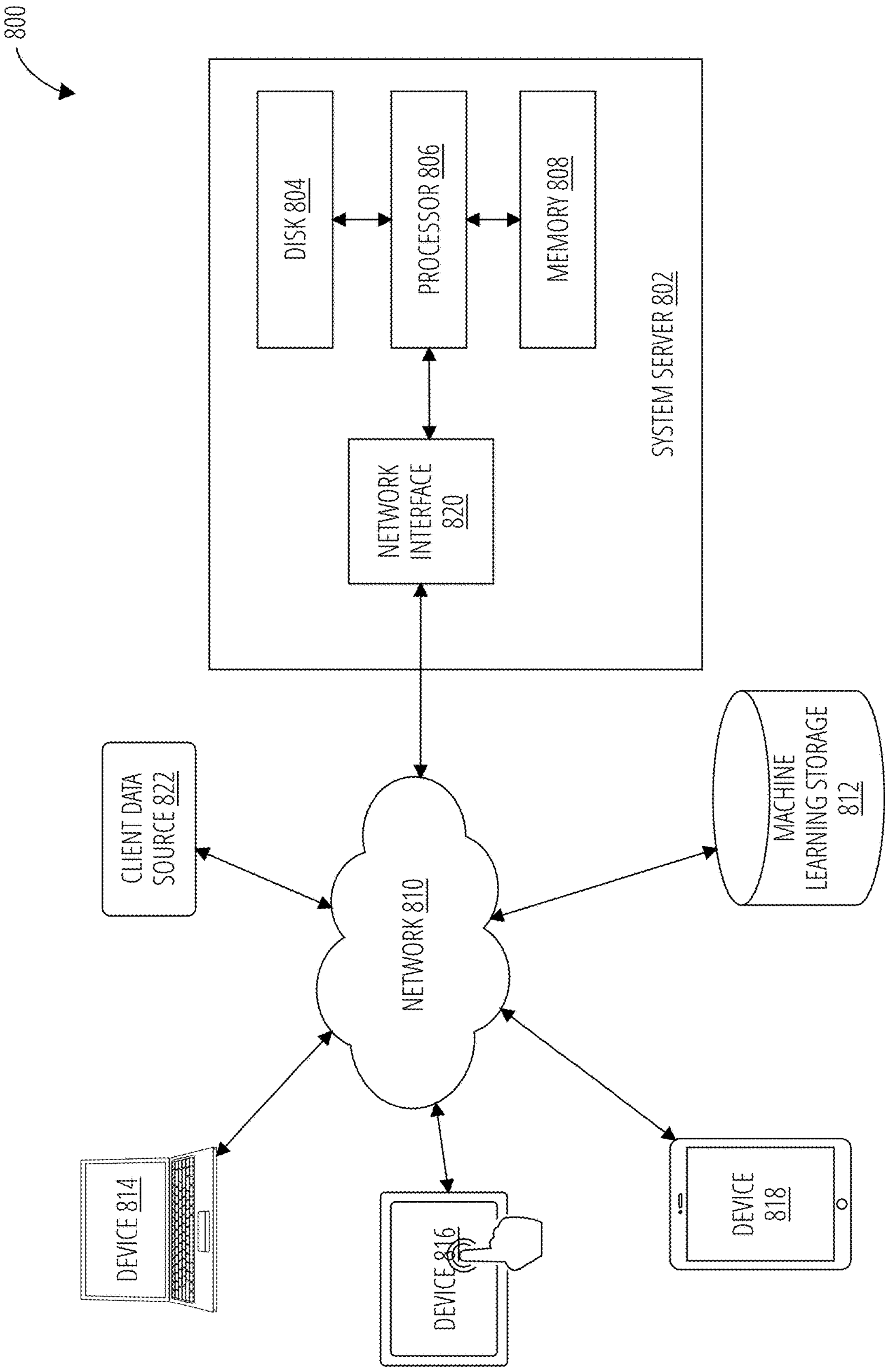
FIG. 8 illustrates a system in accordance with one embodiment.

FIG. 8 illustrates a system 800 in accordance with one embodiment of machine learning interpretability.

System server 802 comprises a machine learning algorithm, a machine learning interpretability module, and other modules and/or algorithms, including access to a library of SHAP algorithms. Machine learning storage 812 can include training data used for training a machine learning algorithm.

System 800 includes a system server 802, machine learning storage 812, client data source 822 and one or more devices 814, 816 and 818. System server 802 can include a memory 808, a disk 804, a processor 806 and a network interface 820. While one processor 806 is shown, the system server 802 can comprise one or more processors. In some embodiments, memory 808 can be volatile memory, compared with disk 804 which can be non-volatile memory. In some embodiments, system server 802 can communicate with machine learning storage 812, client data source 822 and one or more external devices 814, 816 and 818 via network 810. While machine learning storage 812 is illustrated as separate from system server 802, machine learning storage 812 can also be integrated into system server 802, either as a separate component within system server 802 or as part of at least one of memory 808 and disk 804.

System 800 can also include additional features and/or functionality. For example, system 800 can also include additional storage (removable and/or non-removable) including, but not limited to, magnetic or optical disks or tape. Such additional storage is illustrated in FIG. 8 by memory 808 and disk 804. Storage media can include volatile and nonvolatile, removable and non-removable media implemented in any method or technology for storage of information such as computer-readable instructions, data structures, program modules or other data. Memory 808 and disk 804 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 800. Any such non-transitory computer-readable storage media can be part of system 800.

Communication between system server 802, machine learning storage 812 and one or more external devices 814, 91 and 818 via network 810 can be over various network types. In some embodiments, the processor 806 may be disposed in communication with network 810 via a network interface 820. The network interface 820 may communicate with the network 810. The network interface 820 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 800 may take place over hard-wired, cellular, Wi-Fi or Bluetooth networked components or the like. In some embodiments, one or more electronic devices of system 800 may include cloud-based features, such as cloud-based memory storage.

Machine learning storage 812 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Machine learning storage 812 may store metadata regarding the structure, relationships and meaning of data. This information may include data defining the schema of database tables stored within the data. A database table schema may specify the name of the database table, columns of the database table, the data type associated with each column, and other information associated with the database table. Machine learning storage 812 may also or alternatively support multi-tenancy by providing multiple logical database systems which are programmatically isolated from one another. Moreover, the data may be indexed and/or selectively replicated in an index to allow fast searching and retrieval thereof. In addition, machine learning storage 812 can store a number of machine learning models that are accessed by the system server 802. A number of ML models can be used.

In some embodiments where machine learning is used, gradient-boosted trees, ensemble of trees and support vector regression, can be used. In some embodiments of machine learning, one or more clustering algorithms can be used. Non-limiting examples include hierarchical clustering, k-means, mixture models, density-based spatial clustering of applications with noise and ordering points to identify the clustering structure.

In some embodiments of machine learning, one or more anomaly detection algorithms can be used. Non-limiting examples include local outlier factor.

In some embodiments of machine learning, neural networks can be used.

Client data source 822 may provide a variety of raw data from a user, including, but not limited to: point of sales data that indicates the sales record of all of the client's products at every location; the inventory history of all of the client's products at every location; promotional campaign details for all products at all locations, and events that are important/relevant for sales of a client's product at every location.

Using the network interface 820 and the network 810, the system server 802 may communicate with one or more devices 814, 816 and 818. These devices 814, 816 and 818 may include, without limitation, personal computer(s), server(s), various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like.

Using network 810, system server 802 can retrieve data from machine learning storage 812 and client data source 822. The retrieved data can be saved in memory 808 or disk 804. In some embodiments, system server 802 also comprise a web server, and can format resources into a format suitable to be displayed on a web browser.

Once a preliminary machine learning result is provided to any of the one or more devices, a user can amend the results, which are re-sent to machine learning storage 812, for further execution. The results can be amended by either interaction with one or more data files, which are then sent to machine learning storage 812; or through a user interface at the one or more devices 814, 816 and 818. For example, in device 816, a user can amend the results using a graphical user interface.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

training, by a processor, a regression machine learning model using training data comprising training data points for a historical time-series;

utilizing, by the processor, the trained regression machine learning model to generate a prediction;

receiving, by a machine learning interpretability module, the training data, the trained model and the prediction;

determining, for each of the training data points of the training data, a measure of influence for each of the training data points, wherein a procedure for determining the measure of influence for each of the training data points comprises:

a) removing, by the machine learning interpretability module, the training data point from the training data to form an amended training data set;

b) retraining, by the machine learning interpretability module, the trained regression machine learning model on the amended training data set;

c) utilizing, by the machine learning interpretability module, the retrained regression machine learning model to generate an amended prediction;

d) determining, by the machine learning interpretability module, a difference between the prediction generated by the trained regression machine learning model and the amended prediction generated by the retrained regression machine learning model;

e) determining, by the machine learning interpretability module, a measure of influence for the removed training data point, based on the difference;

f) return the removed training data point to the amended training data set along with the measure of influence for the removed training data point;

g) remove, by the machine learning interpretability module, another training data point from the training data to form another amended training data set; and repeat the procedure a)-g) for determining and returning the measure of influence for each of the training data points in the training data; and visually outputting the measure of influence of each of the training data points to a graphical user interface so that a visualization of the training data comprises a visualization of the measure of influence of each of the training points on the prediction.

2. The method of claim 1, wherein the visualization of the training data comprises a gradient representation of the measure of influence of each of the training points.

3. The method of claim 2, wherein the gradient representation comprises a gradient key that indicates the measure of influence of each of the training data points.

4. The method of claim 1, wherein the visualization of the measure of influence of each of the training points on the prediction comprises a visualization of changes from a resulting amended data forecast from the amended training data set for a selected training data point relative to a full data forecast from the training data.

5. The method of claim 4, wherein the graphical user interface is configured to allow a user to select a given one of the training data points from the training data set and visualize the changes from the resulting amended data forecast from the amended training data set for the selected training data point relative to the full data forecast from the training data.

6. A system comprising:

a processor; and a memory storing instructions that, when executed by the processor, configure the system to:

train, by a processor, a regression machine learning model using training data comprising training data points for a historical time-series;

utilize, by the processor, the trained regression machine learning model to generate a prediction;

receive, by a machine learning interpretability module, the training data, the trained model and the prediction;

determine, for each of the training data points of the training data, a measure of influence for the training data points, wherein a procedure for determining the measure of influence for each of the one or more training data points comprises:

a) remove, by the machine learning interpretability module, a first training data point from the training data to form an amended training data set;

b) retrain, by the machine learning interpretability module, the trained regression machine learning model on the amended training data set;

c) utilize, by the machine learning interpretability module, the retrained regression machine learning model to generate an amended prediction;

d) determine, by the machine learning interpretability module, a difference between the prediction generated by the trained regression machine learning model and the amended prediction generated by the retrained regression machine learning model;

e) determine, by the machine learning interpretability module, a measure of influence for the removed first training data point, based on the difference;

f) return the removed first training data point to the amended training data set along with the measure of influence for the removed training data point;

g) remove, by the machine learning interpretability module, another training data point from the training data to form another amended training data set; and repeat the procedure a)-g) for determining and returning the measure of influence for each of the training data points in the training data; and visually output the measure of influence to the one or more training data points to a graphical user interface so that a visualization of the training data comprises a visualization of the measure of influence of each of the training points on the prediction.

7. The system of claim 6, further configured to provide the visualization of the training data comprising a gradient representation of the measure of influence of each of the training points.

8. The system of claim 7, wherein the gradient representation comprises a gradient key that indicates the measure of influence of each of the training data points.

9. The system of claim 6, wherein the visualization of the measure of influence of each of the training points on the prediction comprises a visualization of changes from a resulting amended data forecast from the amended training data set for a selected training data point relative to a full data forecast from the training data.

10. The system of claim 9, wherein the graphical user interface is configured to allow a user to select a given one of the training data points from the training data set and visualize the changes from the resulting amended data forecast from the amended training data set for the selected training data point relative to the full data forecast from the training data.

11. A non-transitory computer-readable storage medium, the computer-readable storage medium including instructions that when executed by a computer, cause the computer to:

train, by a processor, a regression machine learning model using training data comprising training data points for a historical time-series;

utilize, by the processor, the trained regression machine learning model to generate a prediction;

receive, by a machine learning interpretability module, the training data, the trained model and the prediction;

determine, for each of the training data points of the training data, a measure of influence for each of the training data points, wherein a procedure determining the measure of influence for each of the training data points comprises:

a) remove, by the machine learning interpretability module, the training data point from the training data to form an amended training data set;

b) retrain, by the machine learning interpretability module, the trained regression machine learning model on the amended training data set;

c) utilize, by the machine learning interpretability module, the retrained regression machine learning model to generate an amended prediction;

d) determine, by the machine learning interpretability module, a difference between the prediction generated by the trained regression machine learning model and the amended prediction generated by the retrained regression machine learning model;

e) determine, by the machine learning interpretability module, a measure of influence for the removed training data point, based on the difference;

f) return the removed training data point to the amended training data set along with the measure of influence for the removed training data point; and g) remove, by the machine learning interpretability module, another training data point from the training data to form another amended training data set; and repeat the procedure a)-g) for determining and returning the measure of influence for each of the training data points in the training data; and visually output the measure of influence of the one or more training data points to a graphical user interface so that a visualization of the training data comprises a visualization of the measure of influence of each of the training points on the prediction.

12. The non-transitory computer-readable storage medium of claim 11, wherein instructions that when executed by a computer, further cause the computer to provide the visualization of the training data comprising a gradient representation of the measure of influence of each of the training points.

13. The non-transitory computer-readable storage medium of claim 12, wherein the gradient representation comprises a gradient key that indicates the measure of influence of each of the one or more of the training data points.

14. The non-transitory computer-readable storage medium of claim 11, wherein the visualization of the of the measure of influence of each of the training points on the prediction comprises a visualization of changes from a resulting amended data forecast from the amended training data set for a selected training data point relative to a full data forecast from the training data.

15. The non-transitory computer-readable storage medium of claim 14, wherein the graphical user interface is configured to allow a user to select a given one of the training data points from the training data set and visualize the changes from the resulting amended data forecast from the amended training data set for the selected training data point relative to the full data forecast from the training data.

16. The method of claim 1, wherein the training data points for the historical time-series removed by the machine learning interpretability module to form amended training data sets are non-synthetic data points from raw data for real events.

17. The system of claim 6, wherein the training data points for the historical time-series removed by the machine learning interpretability module to form amended training data sets are non-synthetic data points from raw data for real events.

18. The non-transitory computer-readable storage medium of claim 11, wherein the training data points for the historical time-series removed by the machine learning interpretability module to form amended training data sets are non-synthetic data points from raw data for real events.

* * * * *